US008660412B2

(12) United States Patent  (10) Patent No.: US 8,660,412 B2
Kummer et al.  (45) Date of Patent: Feb. 25, 2014

(54) SYSTEM AND METHOD FOR DYNAMICALLY ADJUSTING RECORDING PARAMETERS

(75) Inventors: David A. Kummer, Highlands Ranch, CO (US); Erik J. Swenson, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/592,976

(22) Filed: Aug. 23, 2012

(65) Prior Publication Data

US 2013/0216208 A1  Aug. 22, 2013

Related U.S. Application Data

(60) Provisional application No. 61/526,591, filed on Aug. 23, 2011.

(51) Int. Cl.
  *H04N 5/761* (2006.01)
  *H04N 5/7613* (2006.01)

(52) U.S. Cl.
  USPC .......................................... 386/292; 386/293

(58) Field of Classification Search
  USPC ................... 386/292, 291, 293, 294, 295, 298
  See application file for complete search history.

(56) References Cited

U.S. PATENT DOCUMENTS

| 4,706,121 | A | | 11/1987 | Young |
| 5,187,589 | A | * | 2/1993 | Kono et al. ................... 386/314 |
| 5,335,277 | A | | 8/1994 | Harvey et al. |
| 5,541,738 | A | * | 7/1996 | Mankovitz ................... 386/245 |
| 5,684,969 | A | | 11/1997 | Ishida |
| 5,805,763 | A | | 9/1998 | Lawler et al. |
| 6,701,528 | B1 | | 3/2004 | Arsenault et al. |
| 6,766,523 | B2 | | 7/2004 | Herley |
| 7,024,676 | B1 | | 4/2006 | Klopfenstein |
| 7,487,529 | B1 | | 2/2009 | Orlick |
| 7,490,169 | B1 | | 2/2009 | Ogdon et al. |
| 7,493,312 | B2 | | 2/2009 | Liu et al. |
| 7,542,656 | B2 | | 6/2009 | Cho et al. |

(Continued)

FOREIGN PATENT DOCUMENTS

WO  2011/027236 A1  3/2011

OTHER PUBLICATIONS

U.S. Appl. No. 13/302,852, filed Nov. 22, 2011, Non-Final Rejection mailed May 23, 2013, 19 pages.

(Continued)

*Primary Examiner* — Robert Chevalier
(74) *Attorney, Agent, or Firm* — Kilpatrick Townsend & Stockton LLP

(57) ABSTRACT

Content receivers may be configured to simultaneously record multiple instances of content for multiple programming channels based on content provider instructions. Systems and methods utilize the content receivers to dynamically adjust recording parameters to account for instances of content with a start time and/or end time that falls outside of predefined recording parameters. The dynamically adjusted recording parameters may adjust the number of channels recorded and/or instances of content recorded. The content receiver may compare programming information received at a processing unit with predefined recording parameters and may dynamically adjust the recording parameters based on the comparison. The content receiver may generate on screen display content to include information on the dynamically adjusted recording parameters and may transmit the on screen display content to a content display device for notifying the user of the dynamically adjusted recoding parameters.

20 Claims, 6 Drawing Sheets

(56) References Cited

U.S. PATENT DOCUMENTS

| | | |
|---|---|---|
| 7,577,751 B2 | 8/2009 | Vinson et al. |
| 7,590,993 B1 | 9/2009 | Hendricks et al. |
| 7,804,861 B2 | 9/2010 | Kim |
| 7,926,078 B2 | 4/2011 | Arsenault et al. |
| 7,962,937 B2 | 6/2011 | Cho et al. |
| 8,437,622 B2 | 5/2013 | Casagrande |
| 8,447,170 B2 | 5/2013 | Casagrande |
| 2001/0033736 A1 | 10/2001 | Yap et al. |
| 2002/0055343 A1 | 5/2002 | Stetzler et al. |
| 2002/0097340 A1 | 7/2002 | Takagi et al. |
| 2002/0152299 A1 | 10/2002 | Traversat et al. |
| 2002/0188943 A1 | 12/2002 | Freeman et al. |
| 2003/0110514 A1 | 6/2003 | West et al. |
| 2003/0200548 A1 | 10/2003 | Baran et al. |
| 2004/0015999 A1 | 1/2004 | Carlucci et al. |
| 2004/0162871 A1 | 8/2004 | Pabla et al. |
| 2005/0229213 A1 | 10/2005 | Ellis et al. |
| 2005/0271365 A1 | 12/2005 | Hisatomi |
| 2006/0206819 A1 | 9/2006 | Tsuji et al. |
| 2006/0215993 A1 | 9/2006 | Yamada |
| 2007/0039032 A1 | 2/2007 | Goldey et al. |
| 2007/0157253 A1 | 7/2007 | Ellis et al. |
| 2007/0165855 A1 | 7/2007 | Inui |
| 2007/0204288 A1 | 8/2007 | Candelore |
| 2008/0046929 A1 | 2/2008 | Cho et al. |
| 2008/0092164 A1 | 4/2008 | Agarwal et al. |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0271077 A1 | 10/2008 | Kim et al. |
| 2008/0291206 A1 | 11/2008 | Uchimura et al. |
| 2009/0165057 A1 | 6/2009 | Miller et al. |
| 2009/0178098 A1 | 7/2009 | Westbrook et al. |
| 2009/0260038 A1 | 10/2009 | Acton et al. |
| 2010/0020794 A1 | 1/2010 | Cholas et al. |
| 2010/0158479 A1 | 6/2010 | Craner |
| 2010/0158480 A1 | 6/2010 | Jung et al. |
| 2010/0313222 A1 | 12/2010 | Lee et al. |
| 2011/0043652 A1 | 2/2011 | King et al. |
| 2011/0078750 A1 | 3/2011 | Tam et al. |
| 2012/0278837 A1 | 11/2012 | Curtis et al. |
| 2012/0311634 A1 | 12/2012 | Van Duyn et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |

OTHER PUBLICATIONS

International Search Report and Written Opinion of PCT/US2012/052011 mailed Dec. 17, 2012, 44 pages.

Jung, J., et al., "Design and Implementation of a Multi-Stream CableCARD with a High-Speed DVB-Common Descrambler," ACM Multimedia, 2006, 4 pages.

U.S. Appl. No. 13/286,157, filed Oct. 31, 2011, Non-Final Office Action mailed Jan. 17, 2013, 20 pages.

U.S. Appl. No. 13/215,702, filed Aug. 23, 2011, Notice of Allowance mailed Feb. 11, 2013, 13 pages.

U.S. Appl. No. 13/324,831, filed Dec. 13, 2011 Non-Final Office Action mailed Feb. 28, 2013, 23 pages.

U.S. Appl. No. 13/292,047, filed Nov. 8, 2011 Non-Final Office Action mailed Jan. 18, 2013, 17 pages.

U.S. Appl. No. 13/614,899, filed Sep. 13, 2012 Non-Final Office Action mailed Feb. 5, 2013, 17 pages.

U.S. Appl. No. 13/291,014, filed Nov. 7, 2011 Non-Final Office Action mailed Mar. 29, 2013, 21 pages.

Author Unknown, "Move Networks is Delivering the Next Generation of Television," Move Networks. 2010, obtained online at http://movenetworks.com/, 2 pages.

International Search Report and Written Opinion of PCT/US2012/51992 mailed Nov. 2, 2012, 15 pages.

International Search Report and Written Opinion of PCT/US2012/51987 mailed Oct. 23, 2012, 20 pages.

International Search Report and Written Opinion of PCT/US2012/051984 mailed Nov. 5, 2012, 13 pages.

International Search Report and Written Opinion of PCT/US2012/52002 mailed Oct. 16, 2012, 17 pages.

International Search Report and Written Opinion of PCT/US2012/51964 mailed Nov. 2, 2012, 13 pages.

U.S. Appl. No. 13/149,852, filed May 31, 2011, Non-Final Office Action mailed Dec. 12, 2012, 9 pages.

U.S. Appl. No. 13/215,916, filed Aug. 23, 2011 Notice of Allowance mailed Jan. 4, 2013.

\* cited by examiner

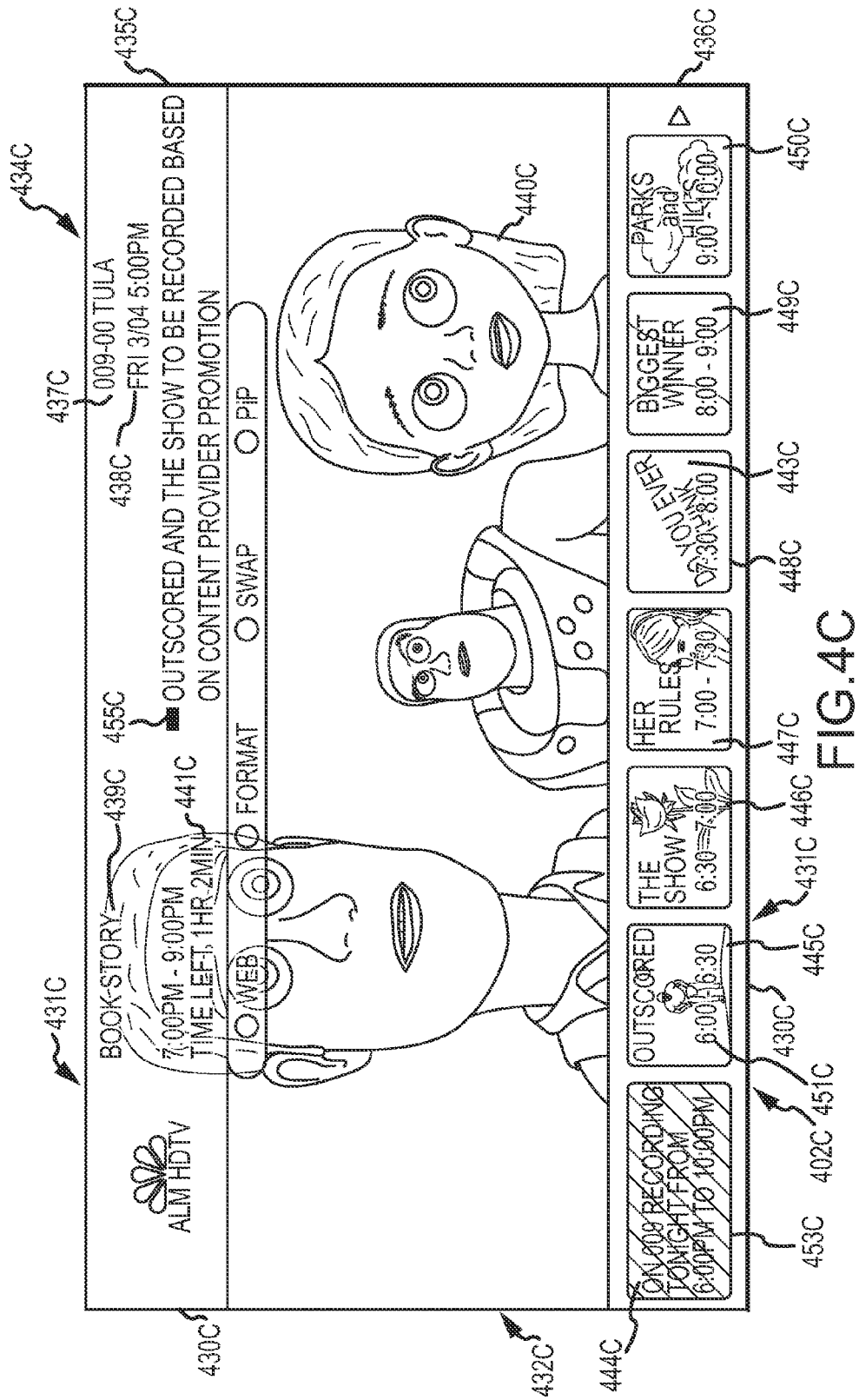

SYSTEM AND METHOD FOR DYNAMICALLY ADJUSTING RECORDING PARAMETERS

PRIORITY CLAIM

This non-provisional application claims priority to U.S. Provisional Application No. 61/526,591, entitled SYSTEM AND METHOD FOR DYNAMICALLY ADJUSTING RECORDING PARAMETERS, filed on Aug. 23, 2011, which is incorporated by reference in its entirety for any and all purposes.

FIELD OF THE INVENTION

This disclosure relates generally to utilizing content receivers to dynamically adjust recording parameters, and more specifically relates to dynamically adjusting a recording timeframe for one or more instances of content to be recorded based on programming information.

SUMMARY

The present disclosure discloses systems and methods for dynamically adjusting recording parameters (such as a recording timeframe) based on programming information received at a content receiver. The content receiver may receive the programming information from a content provider in the form of metadata that may include start and end time information for instances of content that are or will be received at the content receiver, and the content receiver may dynamically adjust the recording timeframe in response to the programming information received. In some implementations, the dynamically adjusted recording parameters include an adjusted number of channels and/or instances of content to be recorded. In some implementations, the programming information utilized to dynamically adjust the recording parameters may be service level and/or event level metadata. In some implementations, the recording parameters may be dynamically adjusted to differ from a predefined set of recording parameters. For example, the recording timeframe may be dynamically adjusted to begin before a predefined recording timeframe start time and/or may be dynamically adjusted to end after a predefined recording timeframe end time.

In one implementation, a method for adjusting recording parameters involves utilizing a content receiver determine from programming information for a plurality of instances of content, a start time and an end time for multiple of instances of content to be recorded simultaneously. The start time and the end time for the plurality of instances of content are compared with a predefined recording timeframe, and the recording timeframe for one or more of the plurality of instances of content is dynamically modified based on the comparison.

In another implementation, a system for adjusting recording parameters includes a content receiver with a processing unit for receiving programming information for a plurality of instances of content to be recorded simultaneously; a memory unit for storing the plurality of simultaneously recorded instances of content; and a communications unit for transmitting at least one of the simultaneously recorded instances of content to a content display device. The processing unit is configured to: receive programming information including a start time and an end time for a plurality of instances of content recorded simultaneously; compare the start time and the end time for the plurality of instances of content with a predefined recording timeframe; and dynamically modify the recording timeframe for one or more of the plurality of instances of content based on the comparison.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 4B and 4C are diagrams illustrating an electronic programming guide with dynamically adjusted recording parameters that may be provided by the system of FIG. 2.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
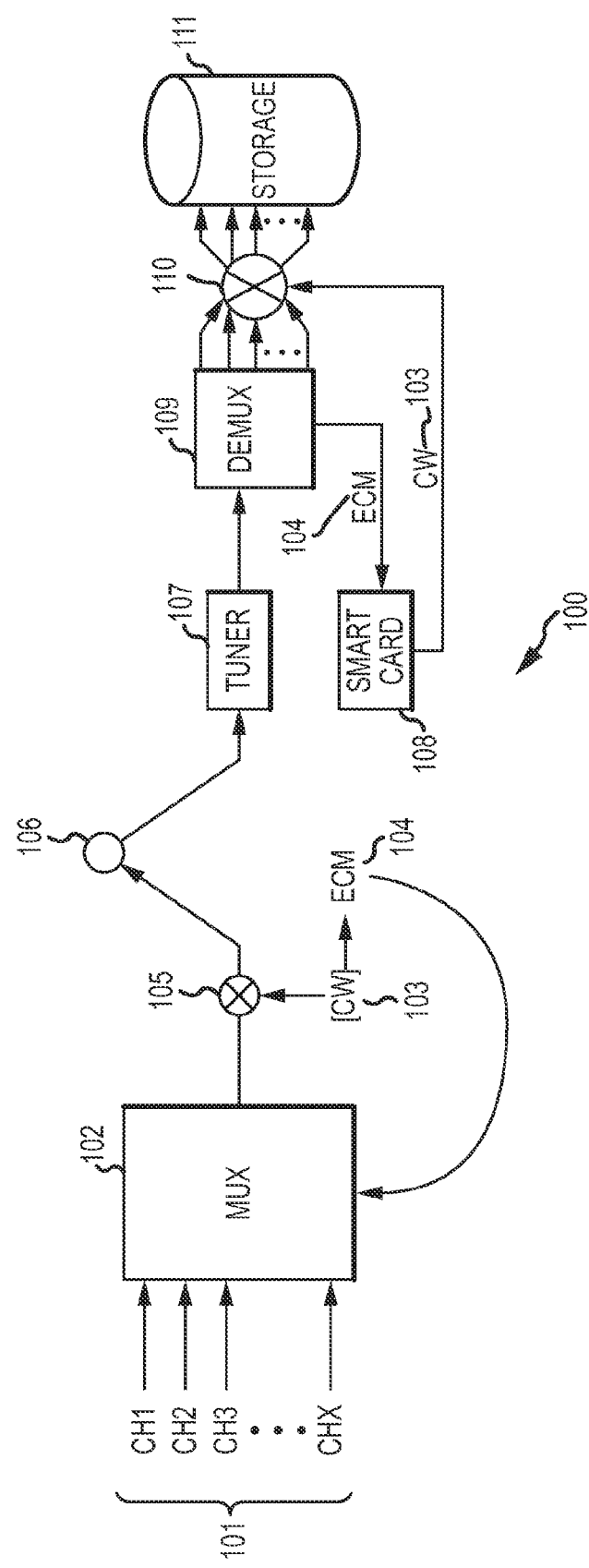
FIG. 1 is a block diagram illustrating a system for automatically recording multiple instances of content from one or more programming providers.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "prime-time events" associated with all channels defined as "prime-time television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive a frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the code word prior to multiplexing. In another example, in some implementations, the data received via the tuned frequency may be demultiplexed before being individually descrambled utilizing the code word.

In view of the functionality of the system of FIG. 1 in which multiple instances of content are recorded simultaneously during a timeframe and stored in the non-transitory storage medium 111 of the content receiver (such as by utilizing predefined recording parameters set by the content provider), there is a need determine whether the recording parameters enable the content receiver to record the received content from start to finish, that enables additional instances of content to be recorded (e.g., in addition to predefined instances of content), and/or that enables additional programming channels to be recorded (e.g., in addition to predefined channels). For example, a recording parameter may include a timeframe for recording the multiple instances of content, and there is a need to determine whether the entire length of the each of the instances of content will be recorded based on the recoding timeframe to avoid the possibility of partially recording the instances of content. A partial recording is one where the instance of content is recorded after the start time and/or in which the recorded instance of content ended before the end time, thus resulting in the beginning and/or the end of the instance of content being cut-off of the recording. Such a partial recording is undesirable for a user that generally expects to replay the entire length of the instance of content from start to finish.

Accordingly, the present disclosure discloses systems and methods for dynamically adjusting recording parameters for recording one or more instances of content utilizing programming information received at a content receiver. In some implementations, a recording timeframe for one or more of the multiple instances of content to be recorded may be dynamically modified based on the programming information. In some implementations, a number of programming channels and/or instances of content may be changed from preset recording parameters or instructions, thereby dynamically adjusting the multiple instances of content to be simultaneously recorded. Information related to the dynamically adjusted recording timeframe, programming channels and/or instances of content may be utilized to generate an electronic programming guide ("EPG"), which may notify the user of the recording modification.

Figure 2:
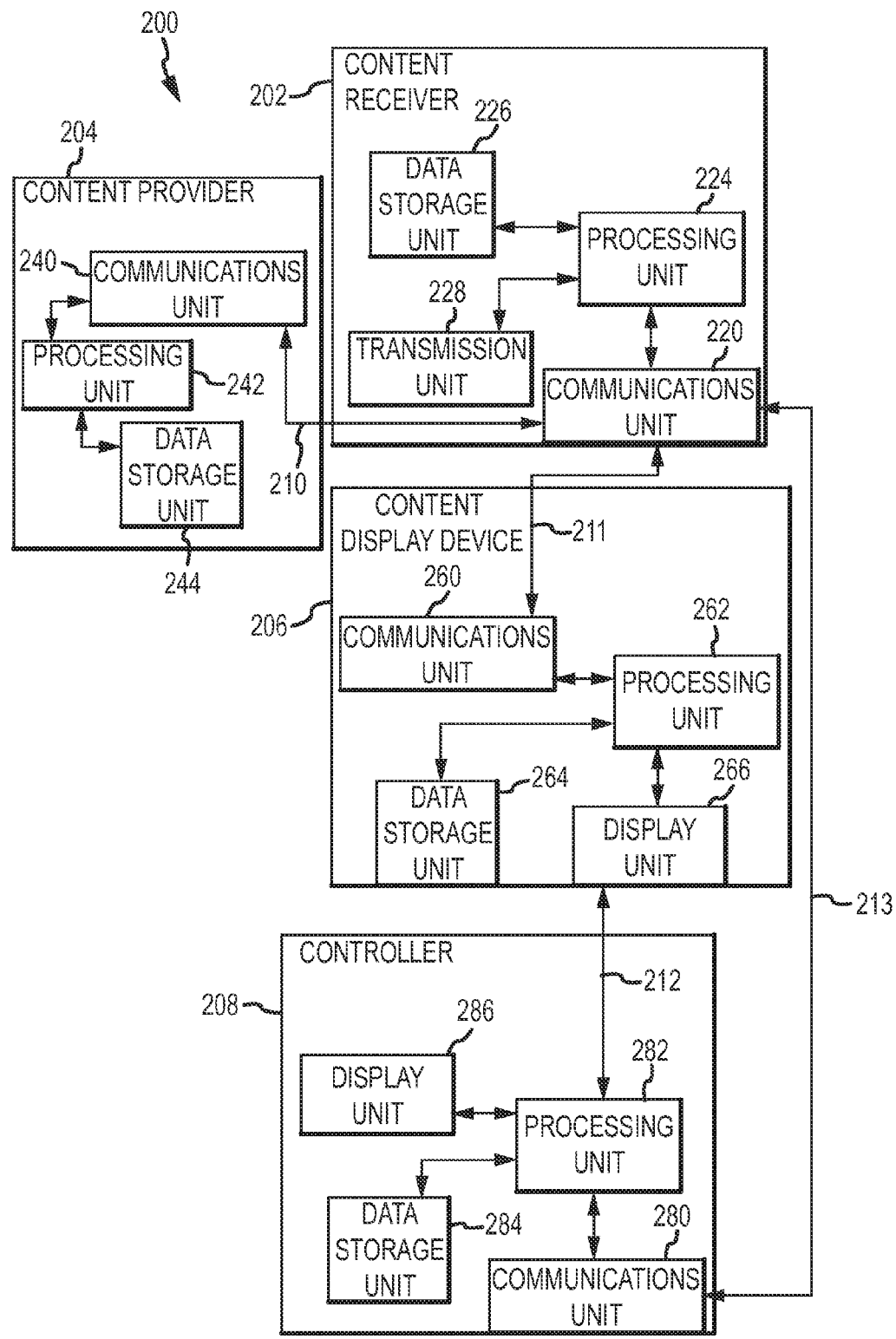
FIG. 2 is a block diagram illustrating a system for dynamically adjusting recording parameters.

FIG. 2 is a block diagram illustrating a system 200 for dynamically adjusting recording parameters. The system 200 may be at least partly incorporated into the system of FIG. 1. The system 200 includes a content receiver 202 (such as a set top box) for receiving and transmitting content (such as television programming and on screen display content), a content provider 204 for transmitting the content (such as a satellite or cable programming service provider), a content display device 206 for receiving and displaying the content (such as a television), and a controller 208 (such as a remote control) for transmitting data such as control signals to the content receiver 202.

The content receiver 202 is a device for receiving content from the content provider 204 and other external sources, for processing or decoding the content and for transmitting the content to the content display device 206. The content receiver 202 is, for example, a set top box, a television receiver, a digital video recorder, a computing device, a gaming device, or a television, which is generally located at a user's location (such as a user's residence or business). The content receiver 202 is operable to receive content from the content provider 204 (and/or another external source) by way of the transmission link 210. Such content is received by the communications unit 220 of the content receiver 202. The processing unit 224 may execute instructions for causing the data storage unit 226 (such as the non-transitory storage medium 111) to record multiple instances of content for a plurality of programming channels simultaneously within a single file described above in connection with FIG. 1, and for dynamically adjusting recording parameters such as predefined recording parameters. The transmission unit 228 may be communicatively coupled to the content display device 206 by way of the transmission link 211.

The content provider 204 (such as a satellite programming company, a cable company, an Internet service provider, e.g., an online video service or Internet video provider, and the like) is generally remotely located from the content receiver 202. The content transmitted may include metadata specifying recording parameters instructing the content receiver 202 to automatically record multiple instances of content simultaneously for multiple programming channels. The metadata may be provided from the content provider 204 to the content receiver 202 in the form of service information ("SI") tables, that may include service description tables ("SDT") and/or event information tables ("EIT").

The content display device 206 is generally arranged proximate to and is communicatively coupled to the content receiver 202 and displays content transmitted by the content receiver 202. While the content display device 206 and the content receiver 202 are depicted as separate components in FIG. 2, the content receiver 202 may be incorporated with the content display device 206. The content display device 206 is, for example, a television, a computer screen, a video screen, or any other display device for displaying content. The content display device 206 is communicatively coupled to the content receiver 202 by way of the transmission link 211.

The controller 208 is generally provided in an area proximate the content receiver 202 and is communicatively coupled to the content display device 206 by way of the transmission link 212, and to the content receiver 202 by way of the transmission link 213. The controller 208 is, for example, a remote control, such as a universal remote control, a dedicated remote control, or a computing device programmed to send command signals (such as selection signals) to the content receiver 202.

Returning to the content receiver 202, the processing unit 224 may be programmed to dynamically configure recording parameters and may dynamically modify recording parameters based on programming information in the form of metadata received from the content provider 204. The metadata may be EPG metadata, may include channel information (such as service level information including local channel information available for the user's locations and channel grouping information for grouping channels capable of being recorded simultaneously), recording information (such event level information including instructions to record or to not record events), and/or may be provided in SI tables that may include SDT and EIT tables. The metadata, such as EPG metadata, may be updated in real-time or near real-time so that the processing unit 224 accurately dynamically configures the recording parameters using up-to-date programming information. This may be useful in cases where breaking announcements are transmitted by a programming channel or where the EPG is updated with corrections.

In some implementations, the processing unit 224 may determine whether the instance of content is to be recorded on a per instance basis. In this case, the metadata may be provided in connection with individual instances of content, and the metadata may include start time and end time information for the instance of content. For example, the processing unit 224 may query metadata for each instance of content and determine whether the instance of content includes associated instructions for recording the instance of content (such as a flag indicating the instance of content is to be recorded in connection with the stored content service feature), the start and end time of the instance of content, as well as other data identifying the instance of content. In addition or alternatively, the processing unit 224 may compare a default or predefined recording timeframe for recording multiple instance of content with a new or updated recording timeframe received from the content provider 204.

In some implementations, the processing unit 224 may dynamically modify the recording parameters, such that the recording parameters to differ from preset or default recording parameters. For example, where the start time or end time of one or more instances of content falls outside of a default recording timeframe, the processing unit 224 may dynamically configure the recording timeframe based on the metadata in order to record the entire length of the instance of content.

In another implementation, where the metadata identifies programming channels to be recorded that differ from a default set of channels to be recorded, the processing unit 224 may dynamically configure the set of programming channels for simultaneous recording. This may be useful where the differing programming channel may be of interest to the user but does not fall within a predefined set of programming channels.

In another implementation, where the metadata identifies an instance of content or set of instances of content that differ from a set of default instances of content, the processing unit 224 may dynamically configure the differing instance of content or set of instances of content to be recorded. This may be useful where the differing instance of content may be of interest to the user but may not fall within a predefined set of instance of content.

The preset or default recording parameters may be based on content provider settings and/or may be associated with a stored content service feature that may be implemented by the content receiver 202. For example, the processing unit 224 may implement the stored content service feature by recording and storing in the memory unit 226, a predefined number of instances of content, for a predefined number of programming channels, and/or for a predefined recording timeframe. According to the implementations provided herein, the default recording parameters for the stored content service feature may be dynamically modified to change the number of instances of content recorded, the number of channels recorded, and/or the recording timeframe.

The modification of the recording parameters may be based on an analysis of the instances of content on a per instance basis, may be based on a comparison of a new or updated recording timeframe received from the content provider (e.g., compared to a previous or default recording timeframe), or both. Such recorded content, or dynamically modified recorded content, may be subsequently available to a user of the content receiver 202 without requiring multiple tuners to receive each of the multiple instances of content, without requiring the smart card 103 to decrypt multiple ECMs, and/or without requiring the combiner 109 to have to descramble multiple signals as described above in connection with the system of FIG. 1.

In some implementations, the processing unit 224 of the content receiver 202 may dynamically configure on screen display content such as an EPG to include information about the dynamically configured recording parameters, thereby visually directing the user to the dynamically modified recordings, which is described below in connection with FIGS. 4B and 4C.

Figure 3:
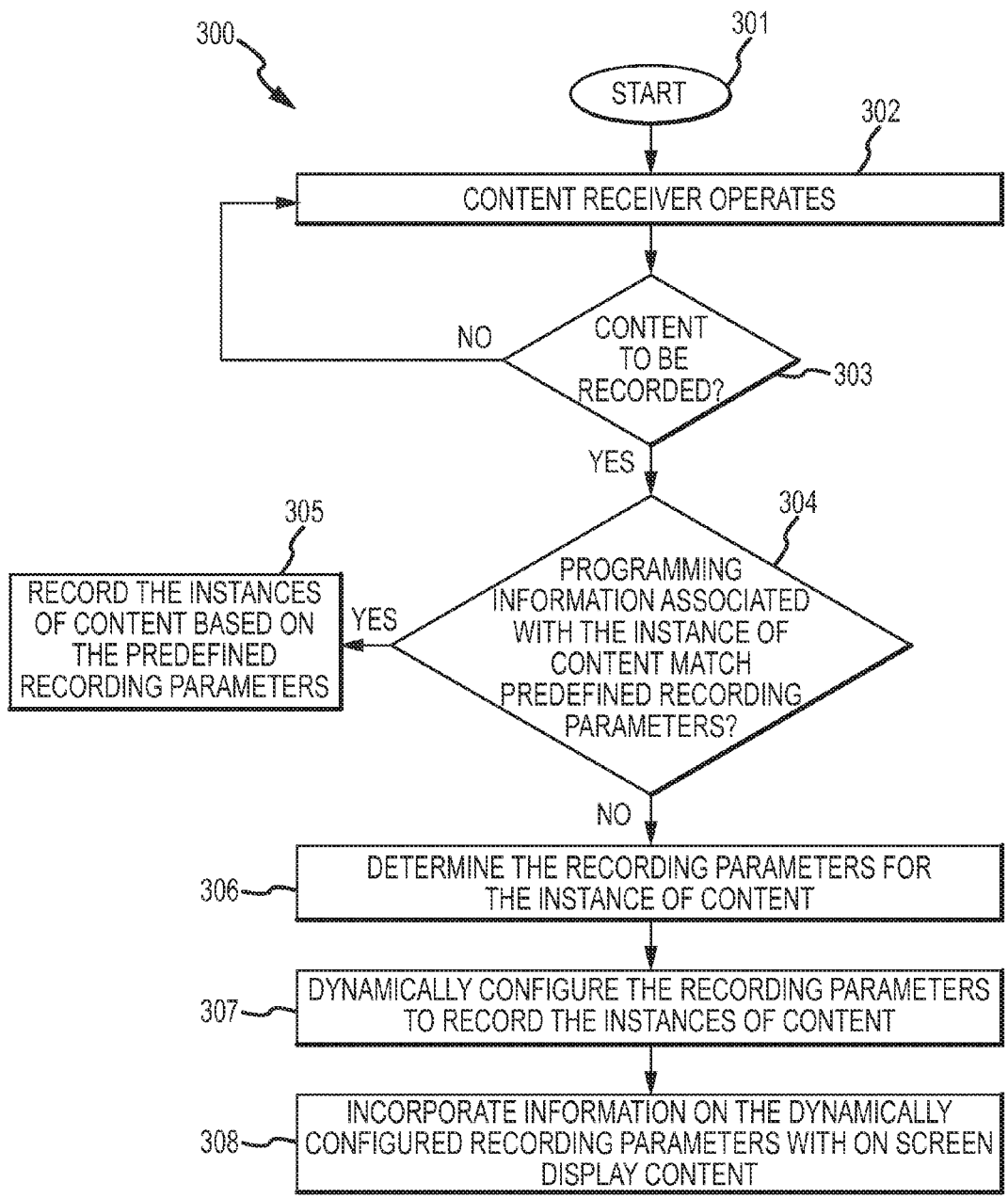
FIG. 3 is a flow chart illustrating a method for dynamically adjusting recording parameters. This method may be performed by the system of FIG. 2.

FIG. 3 illustrates a method 300 for dynamically modifying recording parameters utilizing a content receiver. The method 300 may be performed by the systems 100 and 200 of FIGS. 1 and 2. The flow begins at block 301 and proceeds to block 302 where the content receiver operates. The flow then proceed to block 303 where the processing unit 224 determines whether content is to be recorded. If not, the flow returns to block 302. If so, the flow then proceeds to block 304 where the processing unit 224 optionally determines whether programming information associated with the instance of content (such as metadata identifying the recording status, the start and end time, and other programming information such as EPG data for the instance of content) matches predefined recording parameters. For example, the predefined recording parameters may be a predefined recording group of channels, instances of content for the channels and/or recording timeframe. If so, the flow proceeds to block 305 where the processing unit 224 records the instances of content based on the predefined recording parameters. If not, the flow proceeds to block 306 where the processing unit 224 determines the recording parameters for the instance of content. The flow then proceeds to block 307 where the processing unit 224 dynamically configures the recording parameters to record the instances of content. In some implementations, the flow optionally continues to block 308 where the processing unit 224 incorporates information on the dynamically configured recording parameters with on screen display content, such as an EPG, or on screen display content for overlaying video content, such as live content or previously recorded content.

Returning to block 307, the processing unit 224 may dynamically configure the recording parameters in the manner described above. For example, the processing unit 224 may dynamically configure a recording timeframe and/or the number of instances of content and/or the number of channels to be recorded during the timeframe. The processing unit 224 may implement such a process based on information stored within the memory unit 226 and/or based on metadata (e.g., programming information) received from the content provider 204. In some implementations, the processing unit 224 received programming information on a per instance of content bases and dynamically configures the recording parameters. In addition or alternatively, the processing unit 224 may receive recording parameter information associated with multiple instances of content and, in response, may dynamically configure the recording parameters.

Returning to block 308, the processing unit 224 may incorporate information on the dynamically configured recording parameters with on screen display content, such as an EPG. In some implementations, and as described below in connection with FIGS. 4A and 4B, the EPG may include information on the dynamically configured recording parameter, for example, within a grid of the EPG showing programming information for grouping of instances of content over a channel and timeframe range, or within a message display field proximate the grid, or both. In some implementations, and described below in connection with FIG. 4C, the information on the dynamically configured recording parameter may be incorporated into on screen display content configured as an overlay to video content.

Figure 4A:
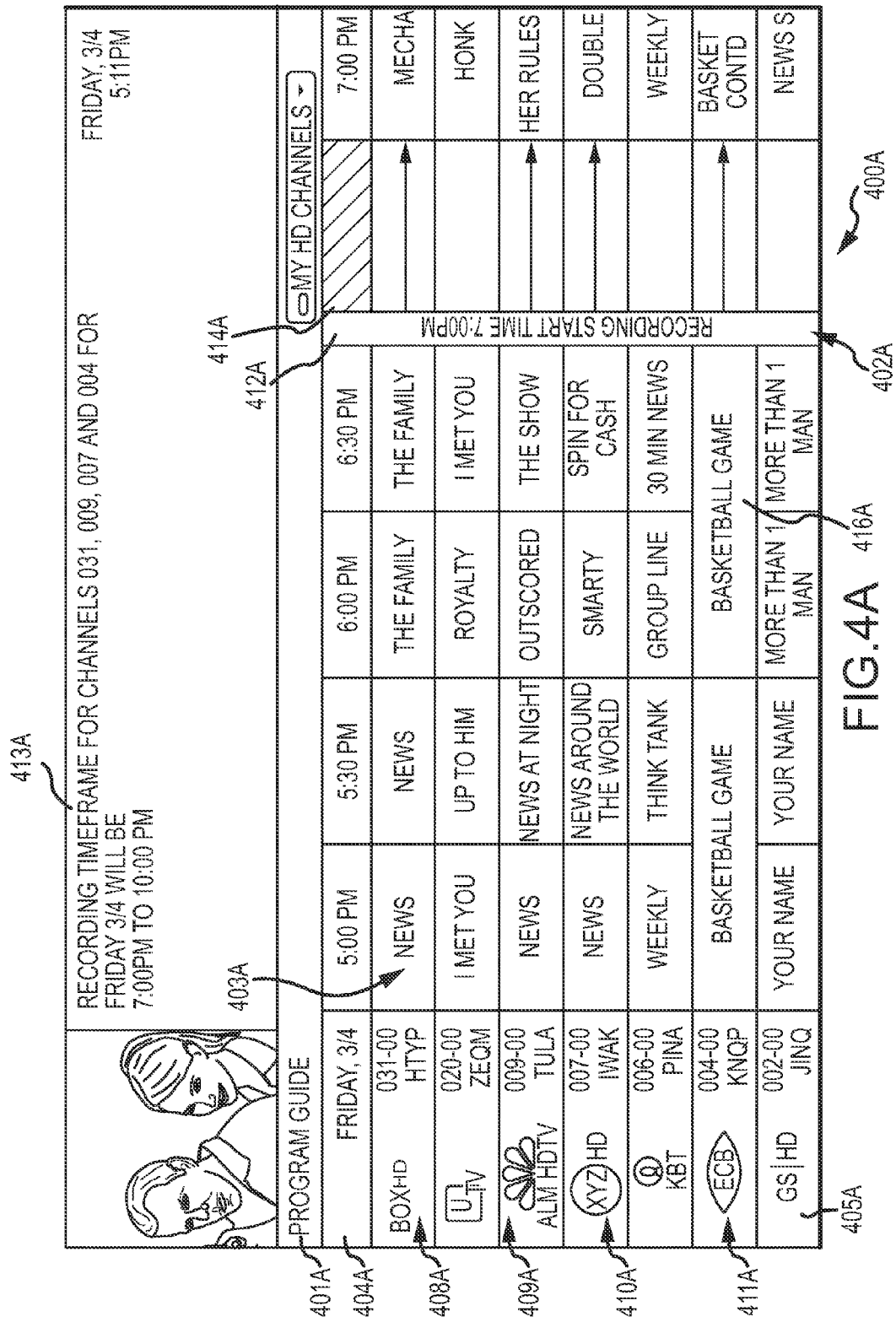
FIG. 4A is a diagram illustrating an electronic programming guide with recording parameters.
Figure 4B:
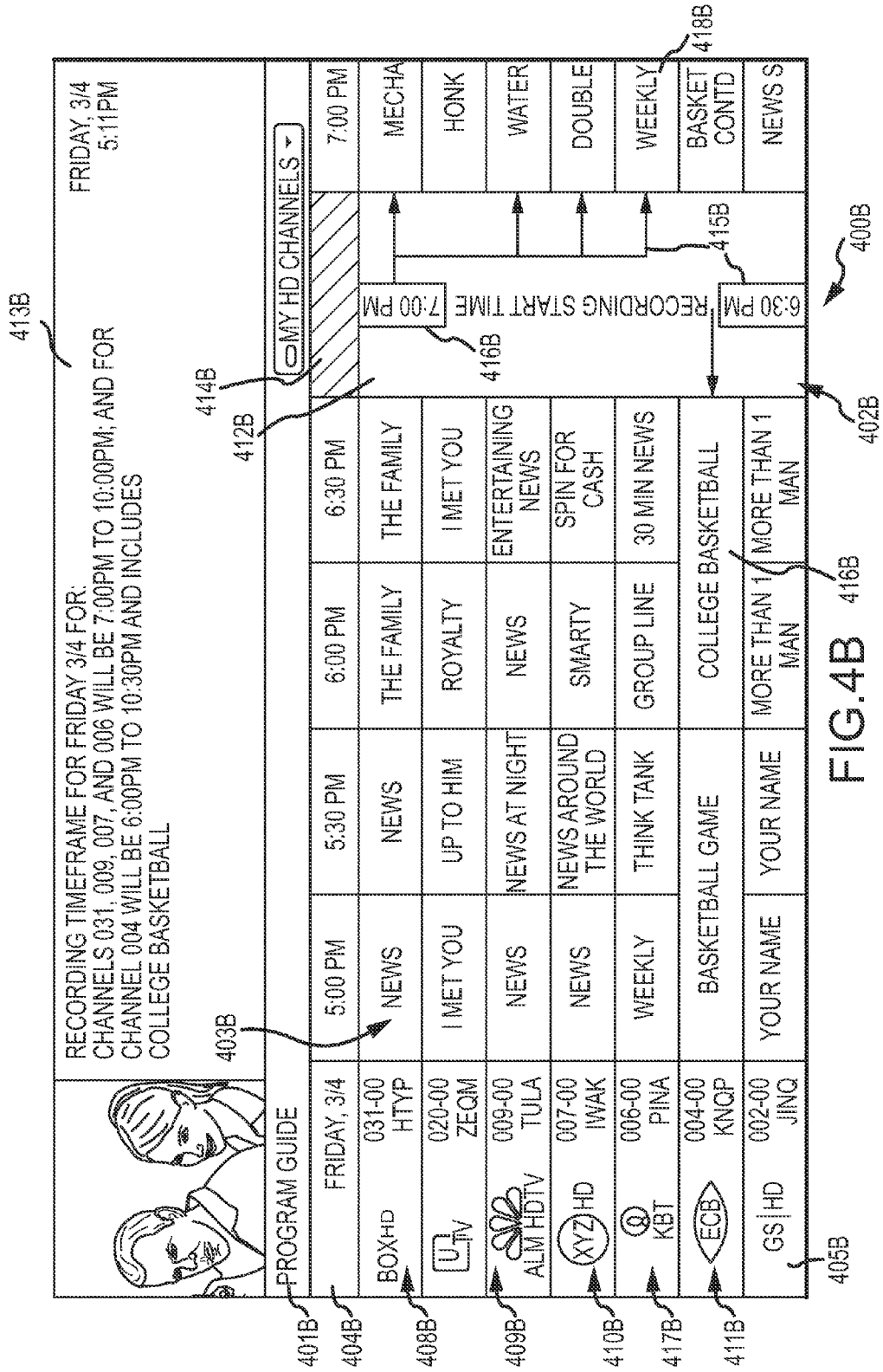

FIGS. 4B and 4C are diagrams illustrating implementations in which information for the dynamically modified recording parameters is provided within on screen display content, which informs the user of the dynamically modified recording parameters and/or recordings. In FIG. 4A, an EPG 401A is shown incorporating a recording timeframe information block 402A within the content provider scheduling information of the EPG. The EPG 401A may be generated utilizing the content receiver 202 in the system of FIG. 2. In FIG. 4A, the EPG 401A is composed of a grid 403A with a date/time axis 404A and a channel axis 405A. The grid 403A is composed of a number of blocks 406A identifying content provider scheduling information 407A such as alpha-numeric text identifying instances of content (e.g., television shows). The recording timeframe information block 402A identifies four channels to be recorded simultaneously, 408A, 409A, 410A and 411A beginning at 7:00 PM. A message 412A may be provided within the recording timeframe information block 402A, e.g., along the channel axis, with information related to the recording timeframe. In FIG. 4A, the message 412 indicates the recording timeframe starts at 7:00 PM for these four channels. In some implementations, the recording timeframe may be a predefined recording timeframe for a number of channels to be recorded simultaneously, described above in connection with FIGS. 1-3. While the recording timeframe information block 402A directly precedes the area of the grid 403B showing the content provider scheduling information for instances of content to be simultaneously recorded beginning at 7:00 PM, the recording timeframe information block 402A may be provided proximate any timeframe within the EPG. In some implementations, additional information about the recording parameters may be displayed in the information field 413A by selecting all or a portion of the recording timeframe information block 402A. In FIG. 4A, the cursor 414A overlies a portion of the recording timeframe information block 402A to cause the information field 413A to display a message about the recording timeframe and the channels to be recorded.

Turning to FIG. 4B, a diagram illustrates information about dynamically modified recording parameters 415B within the EPG grid 403B. The EPG 401B may be generated utilizing the content receiver 202 in the system of FIG. 2. Compared to FIG. 4A, the dynamically modified recording parameters include the instance of content 416B (e.g., college basketball) is to be recorded beginning at 6:00 PM on channel 004, and an additional channel 417B (e.g., channel 006) is to be recorded beginning at 7:00 PM. This information about a dynamically modified recording parameters 415B is incorporated with the recording parameter information 416B that is otherwise unchanged compared to FIG. 4A (e.g., that the instances of content for channels 031, 009, 007 and 006 is to be recorded beginning at 7:00 PM). In some implementations, the additional information about the dynamically modified recording parameters may be displayed in the information field 413B by selecting all or a portion of the recording timeframe information block 402B. In FIG. 4B, the cursor 414B overlies a portion of the recording timeframe information block 402B to cause the information field 413B to display a message about the dynamically modified recording timeframe. For example, compared to FIG. 4A, the dynamically modified recording parameters of FIG. 4B additionally includes recording the additional instance of content 416B at the modified recording timeframe of between 6:00 PM and 10:30 PM, and that the additional channel 417B is to be recorded to capture the additional instances of content 418B. Accordingly, the information field 413B includes information about each of the dynamically modified recording parameters 415B (e.g., the dynamically modified recording timeframe) for the programming channel 411B and the additionally recorded programming channel 417B.

While FIG. 4B shows the information about the dynamically modified recording parameters 415B within the recording timeframe information block 402B, a portion of which relates to the recording timeframe starting time, the recording timeframe information may also be shown as a dynamically adjusted timeframe range, a recording timeframe end time, and so on. In addition, while FIG. 4B displays information about the dynamically modified recording parameters 415B, which indicates an additional channel 417B and that an additional instance of content 416B is to be recorded, less or different channels may be recorded compared to preset or customary recording settings (e.g., the customary four channels shown in FIG. 4A).

FIG. 4C is a diagram illustrating on screen display content 430C including information on the recording timeframe information block 402C. The on screen display content 430C may be provided as an overlay 431C to video content 432C and may be generated utilizing the content receiver 202 in the system of FIG. 2. In FIG. 4C, the on screen display content 430C includes programming information 434C in an upper region 435C and the information on the recording timeframe information block 402C in a lower region 436C.

The upper region 435C includes programming information 434C such as a channel and/or network identifier 437C, a date and/or time field 438C, an identification field 439C identifying the instance of content 440C displayed as the video content 432D, a run and/or remaining time field 441C identifying the run and/or remaining time for the instance of content 440C, and so on.

The instance of content 440C displayed as the video content 432C may be live or previously recorded content. In the lower region 436D of the on screen display content 430D, information identifying information on the recording timeframe information block 402D may be displayed as a series of pictures 443C identifying the instances of content associated with the programming channel 437C that are to be recorded.

The recording timeframe information block 402D includes a message field 444C indicating that the recording timeframe for the programming channel 437C is from 6:00 PM to 10:00 PM. To the right of the message field 444C, the pictures 443C identify the various instances of content 445C, 446C, 447C, 448C, 449C and 450C and their respective timeframes 451C to be recorded for the programming channel 437C. The user may navigate to the information on the recording timeframe information block 402C utilizing the cursor 453C and may select all or a portion of the recording timeframe information block 402B utilizing cursor 453C. In FIG. 4C, the cursor 453C overlies a portion of the recording timeframe information block 402A at the message field 444C, and in response, the content receiver 202 transmits the information field 455C within the upper region 435C to display a message about instances of content to be the recorded during the dynamically modified recording timeframe of 6:00 PM to 10:00 PM. For example, compared to preset or customary recording settings in which instance of content are recorded from 7:00 PM to 10:00 PM in FIG. 4A in which instances of content 456A and 457A from programming channels 409A (e.g., programming channel 009) are not set to record, the dynamically modified recording parameters of FIG. 4C additionally include recording the additional instances of content 445C and 446C from programming channel 437C (e.g., programming channel 009) at the modified recording timeframe between 6:00 PM and 10:00 PM.

While the information on the stored content service feature 402C is provided in a separate, lower overlaying region 436C compared to the upper overlaying region 435C in FIG. 4C, the information on the recording timeframe information block 402C may be displayed in any region within the on screen display content 430C, alone or in combination with the programming information 434C, and the region may be an overlay 431C to any portion of the video content 432C (such as at a left side, right side, middle, center, upper and/or lower portion). In addition, the on screen display content 430C may be partially transparent (e.g., as shown in the upper region 435C) or may be opaque (e.g., as shown in the lower region 436C) with respect to the video content 432C.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for adjusting recording parameters utilizing a content receiver, the method comprising:
   utilizing programming information for a plurality of instances of content to be recorded simultaneously to determine a start time and an end time for the plurality of instances of content;
   comparing the start time and the end time for each of the plurality of instances of content with a predefined recording timeframe; and
   dynamically modifying the recording timeframe for one or more of the plurality of instances of content based on the comparison.

2. The method of claim 1, further comprising:
   generating an electronic programming guide comprising a grid of a plurality of programming channels and timeframes, and blocks within the grid identifying the programming information for a plurality of instances of content;
   incorporating information about the dynamically modified recording timeframe within the electronic programming guide; and
   transmitting the electronic programming guide to a content display device.

3. The method of claim 1, further comprising:
   generating on screen display content comprising information about the dynamically modified recording timeframe; and
   transmitting the on screen display content to the content receiver as an overlay to video content;
   wherein the video content is associated with a programming channel and the information about the dynamically modified recording timeframe is associated with the programming channel.

4. The method of claim 1, wherein the plurality of the instances of content recorded simultaneously is received at a single frequency by a tuner of the content receiver.

5. The method of claim 1, further comprising:
   determining from the programming information a recording status for the plurality of instances of content;
   comparing the recording status for the plurality of instances of content with a predefined set of instances of content for recording; and
   dynamically modifying the set of instances of content for recording based on the comparison.

6. The method of claim 5, further comprising:
   generating an electronic programming guide comprising a grid of a plurality of programming channels and timeframes, and blocks within the grid identifying the programming information for a plurality of instances of content;
   incorporating information about the dynamically modified set of instances of content for recording within the electronic programming guide; and
   transmitting the electronic programming guide to a content display device.

7. The method of claim 1, further comprising:
   determining from the programming information a recording status for a plurality of programming channels for recording one or more instances of content;
   comparing the recording status for the plurality of programming channels with a predefined set of programming channels for recording; and
   dynamically modifying the set of programming channels for recording based on the comparison.

8. The method of claim 7, further comprising:
   generating an electronic programming guide comprising a grid of a plurality of programming channels and timeframes, and blocks within the grid identifying the programming information for a plurality of instances of content;
   incorporating information about the dynamically modified set of programming channels for recording within the electronic programming guide; and
   transmitting the electronic programming guide to a content display device.

9. The method of claim 8, wherein the incorporating information about the dynamically modified set of programming channels comprises incorporating information about instances of content associated with the modified set of programming channels within the electronic programming guide.

10. A system for adjusting recording parameters comprising a content receiver, the content receiver comprising:
    a processing unit for receiving programming information for a plurality of instances of content to be recorded simultaneously;
    a memory unit for storing the plurality of simultaneously recorded instances of content; and
    a communications unit for transmitting at least one of the simultaneously recorded instances of content to a content display device;
    wherein the processing unit is configured to:
       receive programming information comprising a start time and an end time for a plurality of instances of content to be recorded simultaneously;
       compare the start time and the end time for the plurality of instances of content with a predefined recording timeframe; and
       dynamically modify the recording timeframe for one or more of the plurality of instances of content based on the comparison.

11. The system of claim 10, wherein:
    the processing unit is further configured to utilize the programming information to generate an electronic programming guide and incorporate information for the dynamically modified recording timeframe in the electronic programming guide; and
    the communications unit is configured to transmit the electronic programming guide to the content receiver.

12. The system of claim 11, wherein:
    the communications unit is configured to transmit the electronic programming guide to the content receiver as an overlay to video content; and
    wherein the video content is associated with a programming channel and the information for the dynamically modified recording timeframe is associated with the programming channel.

13. The system of claim 10, wherein the content receiver further comprises a tuner configured to receive the plurality of instances of content recorded simultaneously on a single frequency.

14. The system of claim 10, wherein the processing unit is further configured to:
    determine from the programming information a recording status for the plurality of instances of content;
    compare the recording status for the plurality of instances of content with a predefined set of instances of content for recording; and dynamically modify the set of instances of content for recording based on the comparison.

15. The system of claim 14, wherein:
the processing unit is further configured to incorporate information about the dynamically modified set of instances of content for recording within an electronic programming guide; and
the communications unit is configured to transmit the electronic programming guide to a content display device.

16. The system of claim 10, wherein the processing unit is further configured to:
determine from the programming information a recording status for a plurality of programming channels for recording one or more instances of content;
compare the recording status for the plurality of programming channels with a predefined set of programming channels for recording; and
dynamically modify the set of programming channels for recording based on the comparison.

17. The system of claim 16, wherein:
the processing unit is further configured to incorporate information about the dynamically modified set of programming channels for recording within an electronic programming guide; and
the communications unit is configured to transmit the electronic programming guide to a content display device utilizing the content receiver.

18. The system of claim 17, wherein the processing unit incorporates information about the dynamically modified set of programming channels by incorporating information about instances of content associated with the modified set of programming channels within the electronic programming guide.

19. The system of claim 10, wherein:
the processing unit is further configured to utilize the programming information to generate on screen display content and incorporate information about the dynamically modified recording timeframe in the on screen display content; and
the communications unit is configured to transmit the on screen display content to the content receiver as an overlay to video content.

20. The system of claim 19, wherein the video content is associated with a programming channel and the information about the dynamically modified recording timeframe is associated with an instance of content for the programming channel.

* * * * *